(12) United States Patent
Katsuta (10) Patent No.: US 11,318,927 B2
(45) Date of Patent: May 3, 2022

(54) CONTROL DEVICE FOR HYBRID VEHICLE AND CONTROL SYSTEM FOR HYBRID VEHICLE

(71) Applicant: TOYOTA JIDOSHA KABUSHIKI KAISHA, Aichi-ken (JP)

(72) Inventor: Hiroshi Katsuta, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 400 days.

(21) Appl. No.: 16/595,531

(22) Filed: Oct. 8, 2019

(65) Prior Publication Data
US 2020/0108821 A1 Apr. 9, 2020

(30) Foreign Application Priority Data
Oct. 9, 2018 (JP) .............................. JP2018-191016

(51) Int. Cl.
| | |
|---|---|
| B60W 20/20 | (2016.01) |
| B60W 20/12 | (2016.01) |
| G08G 1/01 | (2006.01) |
| F01N 3/20 | (2006.01) |
| B60W 20/13 | (2016.01) |

(52) U.S. Cl.
CPC ............ *B60W 20/20* (2013.01); *B60W 20/12* (2016.01); *B60W 20/13* (2016.01); *F01N 3/2006* (2013.01); *G08G 1/012* (2013.01)

(58) Field of Classification Search
CPC ...... B60W 10/04; B60W 10/06; B60W 20/12; B60W 20/16; B60W 20/20; G08G 1/012; G08G 1/0125; F01N 3/2006
See application file for complete search history.

(56) References Cited

U.S. PATENT DOCUMENTS

| | | | |
|---|---|---|---|
| 6,381,955 B1* | 5/2002 | Morganti .............. | B60W 10/08 60/300 |
| 2014/0067237 A1* | 3/2014 | Martin .................... | F02D 17/04 701/112 |

(Continued)

FOREIGN PATENT DOCUMENTS

| | | |
|---|---|---|
| JP | 2008279853 A | 11/2008 |
| JP | 2014101051 A | 6/2014 |

(Continued)

*Primary Examiner* — Jeffrey J Restifo
(74) *Attorney, Agent, or Firm* — Hauptman Ham, LLP (57) ABSTRACT

A control device for a hybrid vehicle includes a driving control part configured to acquire for each driving road section from a server a value of the output parameter linked with a vehicle speed of the same extent as the scheduled vehicle speed when driving over a driving road section on a scheduled driving route to calculate for each driving road section the scheduled vehicle demanded output when driving over the driving road section or acquire from the server the scheduled vehicle demanded output for each driving road section calculated based on the value of the output parameter for each driving road section at the server to heat the catalyst device before using the output of the internal combustion engine as part of the drive power when there is the driving road section where the scheduled vehicle demanded output becomes the engine start output or more.

8 Claims, 6 Drawing Sheets

(56) References Cited

U.S. PATENT DOCUMENTS

| | | | | |
|---|---|---|---|---|
| 2014/0081563 | A1* | 3/2014 | Wang | B60W 20/16 |
| | | | | 701/113 |
| 2014/0100728 | A1* | 4/2014 | Whitney | B60W 10/06 |
| | | | | 701/22 |
| 2014/0288736 | A1* | 9/2014 | Martin | B60W 20/00 |
| | | | | 701/22 |
| 2015/0285161 | A1* | 10/2015 | Ulrey | B60W 20/16 |
| | | | | 477/3 |
| 2016/0052508 | A1* | 2/2016 | Teraya | B60W 10/06 |
| | | | | 701/22 |
| 2017/0130635 | A1* | 5/2017 | Smith | B60K 6/24 |
| 2018/0030908 | A1* | 2/2018 | Pursifull | B60K 6/48 |
| 2018/0170360 | A1 | 6/2018 | Kim et al. | |
| 2018/0281774 | A1* | 10/2018 | Fukuda | B60W 50/0097 |
| 2019/0249640 | A1* | 8/2019 | Miller | B60W 20/15 |
| 2020/0063626 | A1* | 2/2020 | Dudar | F01N 3/2006 |
| 2020/0072108 | A1* | 3/2020 | Korenaga | F02D 41/0235 |
| 2020/0108821 | A1* | 4/2020 | Katsuta | F01N 3/2006 |
| 2020/0156619 | A1* | 5/2020 | Izuoka | B60W 10/04 |
| 2021/0087987 | A1* | 3/2021 | Jakovlev | B60W 10/26 |
| 2021/0107448 | A1* | 4/2021 | Nose | B60K 13/04 |
| 2021/0135483 | A1* | 5/2021 | Hirooka | B60K 6/445 |
| 2021/0270194 | A1* | 9/2021 | Kozaki | F02D 41/062 |
| 2021/0300329 | A1* | 9/2021 | Amano | B60W 10/08 |
| 2021/0309207 | A1* | 10/2021 | Frederiksen | F01N 3/2026 |

FOREIGN PATENT DOCUMENTS

| | | |
|---|---|---|
| JP | 2018-100035 A | 6/2018 |
| WO | 2013094045 A1 | 6/2013 |

* cited by examiner

CONTROL DEVICE FOR HYBRID VEHICLE AND CONTROL SYSTEM FOR HYBRID VEHICLE

RELATED APPLICATION(S)

The present application claims priority of Japanese Patent Application No. 2018-191016, filed Oct. 9, 2018, the disclosure of which is hereby incorporated by reference herein in its entirety.

FIELD

The present disclosure relates to a control device for a hybrid vehicle and to a control system for a hybrid vehicle.

BACKGROUND

Japanese Unexamined Patent Publication No. 2018-100035 discloses a hybrid vehicle configured to use a history of outputs (driving loads) of a plurality of vehicles collected at a cloud server to calculate an output of a scheduled driving route of a host vehicle and performs catalyst heating control in preparation for an internal combustion engine being started due to an increase in the vehicle demanded output in a high load area where the calculated output is larger than a predetermined threshold value.

SUMMARY

However, the data of the output collected at the cloud server disclosed in Japanese Unexamined Patent Publication No. 2018-100035 was not data linked with the vehicle speed. Therefore, data obtained when driving on the scheduled driving route by different vehicle speeds, such as data of output when congestion occurred at a scheduled driving route, data of output when no congestion occurred, etc., were mixed together. For this reason, a discrepancy easily arose between the output of the scheduled driving route of the host vehicle calculated using the history of outputs of the plurality of vehicles collected at the cloud server and the output of the host vehicle when actually driving on the scheduled driving route and it was liable to become unable to perform catalyst heating control at a suitable timing in preparation for an increase in the vehicle demanded output.

The present disclosure was made in consideration of such a problem and has as its object to enable performance of catalyst heating control at a suitable timing in preparation for an increase in the vehicle demanded output.

To solve the above problem, according to one aspect of the present disclosure, there is provided a control device for a hybrid vehicle for controlling a hybrid vehicle which is provided with an internal combustion engine provided with a catalyst device for purifying exhaust discharged from an engine body, a rotating electric machine driven by electric power of a battery, and a communication device configured to be able to communicate with a server storing values of a parameter relating to outputs of a plurality of vehicles when the plurality of vehicles are driving over a preset plurality of road sections linked with vehicle speeds at that time and collected for each road section and which is able to be driven by the output of at least one of the internal combustion engine and the rotating electric machine. The control device comprises a driving control part using the output of the internal combustion engine as part of the drive power and driving the vehicle by the outputs of the internal combustion engine and the rotating electric machine if when making the internal combustion engine stop and driving by the output of the rotating electric machine, the vehicle demanded output becomes an engine start output or more. The driving control part is configured to acquire a value of the parameter linked with a vehicle speed of the same extent as the scheduled vehicle speed when driving over a road section present on a scheduled driving route as a driving road section for each driving road section from the server and to calculate the scheduled vehicle demanded output when driving over the driving road section based on the acquired value of the parameter for each driving road section or to acquire from the server the scheduled vehicle demanded output for each driving road section calculated based on the value of the parameter for each driving road section at the server so as to heat the catalyst device before using the output of the internal combustion engine as part of the drive power when there is a driving road section where the scheduled vehicle demanded output becomes the engine start output or more.

Further, according to another aspect of the present disclosure, there is provided a control system for a hybrid vehicle able to be driven by at least one of outputs of an internal combustion engine provided with a catalyst device for purifying exhaust discharged from an engine body and a rotating electric machine driven by electric power of a battery. The control system comprises a server storing values of a parameter relating to outputs of a plurality of vehicles including the hybrid vehicle when the plurality of vehicles are driving over a preset plurality of road sections linked with vehicle speeds at that time and collected for each road section, a communication device mounted in the hybrid vehicle and able to communicate with the server, and a control device mounted in the hybrid vehicle and using the output of the internal combustion engine as part of the drive power to thereby drive the hybrid vehicle by the outputs of the internal combustion engine and the rotating electric machine if when making the internal combustion engine stop and driving by the output of the rotating electric machine, the vehicle demanded output becomes an engine start output or more. The control device is configured to acquire a value of the parameter linked with a vehicle speed of the same extent as the scheduled vehicle speed when driving over a road section present on a scheduled driving route of the hybrid vehicle as a driving road section for each driving road section from the server and to calculate the scheduled vehicle demanded output when driving over the driving road section based on the acquired value of the parameter for each driving road section or to acquire from the server the scheduled vehicle demanded output for each driving road section calculated based on the value of the parameter for each driving road section at the server and to heat the catalyst device before using the output of the internal combustion engine as part of the drive power when there is a driving road section where the scheduled vehicle demanded output becomes the engine start output or more.

According to these aspects of the present disclosure, it is possible to perform catalyst heating control at a suitable timing in preparation for an increase in vehicle demanded output.

DESCRIPTION OF EMBODIMENTS

Below, referring to the drawings, embodiments of the present disclosure will be explained in detail. Note that, in the following explanation, similar components will be assigned the same reference notations.

Figure 1:
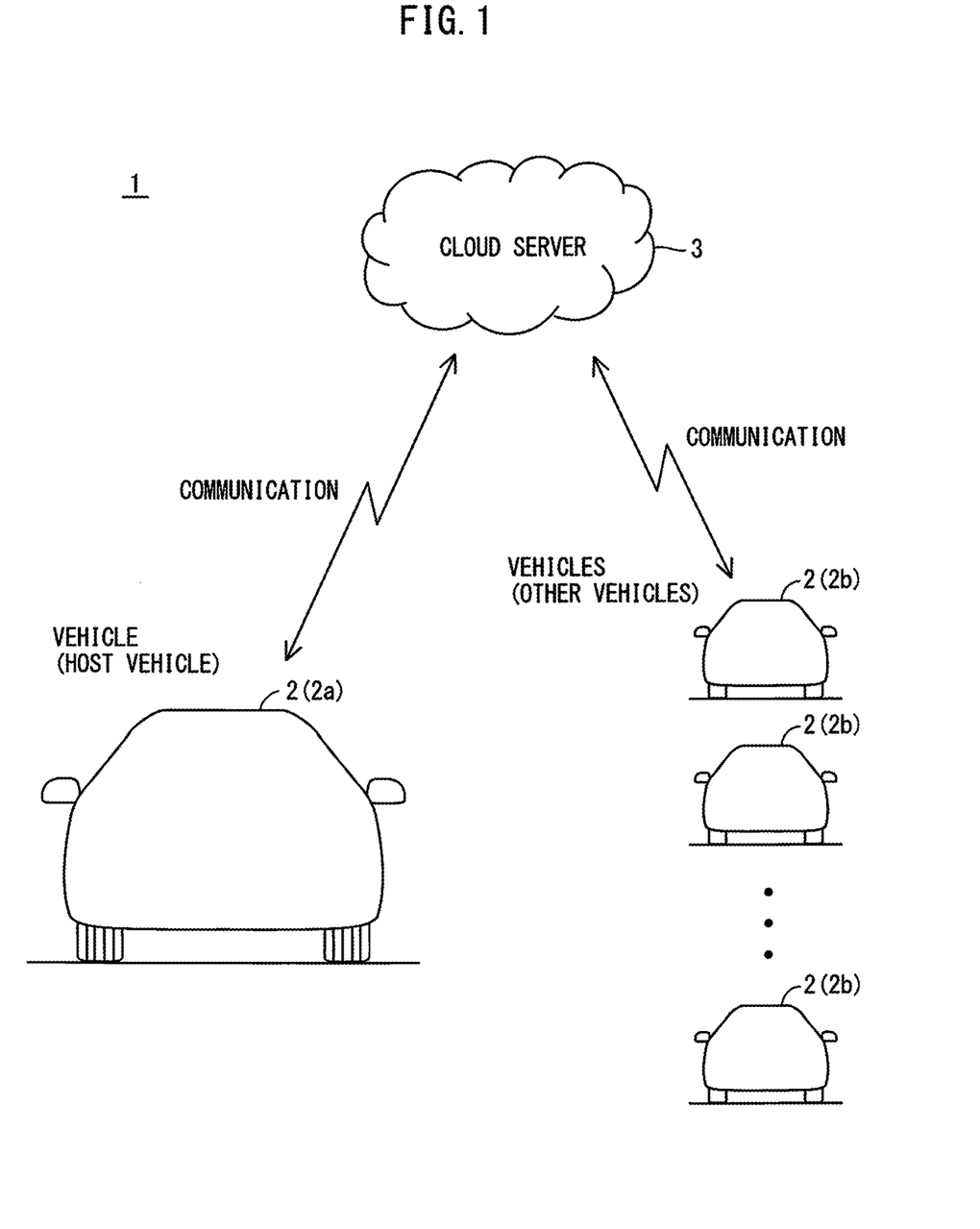
FIG. 1 is a schematic view showing an overall configuration of a vehicle control system according to one embodiment of the present disclosure.

FIG. 1 is a schematic view showing an overall configuration of a vehicle control system 1 according to an embodiment of the present disclosure.

The vehicle control system 1 has a plurality of vehicles 2 and a cloud server 3.

Each of the vehicles 2 is configured to be able to wirelessly communicate with the cloud server 3. Each of the vehicles 2, for example, sends the current position of the vehicle 2 and other information relating to driving of the vehicle 2 (below, referred to as the "driving information") every predetermined period to the cloud server 3.

The cloud server 3 is configured to store and collect driving information received from the vehicles 2. The cloud server 3 sends information collected at the cloud server 3 to the vehicles 2 in accordance with requests from the vehicles 2.

In this way, the vehicle control system 1 is configured so that each of the vehicles 2 can utilize the driving information of the vehicles 2 collected at the cloud server 3.

Note that in the following explanation, in accordance with need, the vehicle performing the driving control according to the present embodiment explained later among the vehicles 2 will be referred to as the "host vehicle 2a" while vehicles other than the host vehicle 2a will be referred to as the "other vehicles 2b". In the present embodiment, the host vehicle 2a is a hybrid vehicle or a plug-in hybrid vehicle. On the other hand, the other vehicles 2b are not particularly limited in type so long as vehicles which can send driving information to the cloud server 3. For example, in the same way as the host vehicle 2a, they may also be hybrid vehicles or plug-in hybrid vehicles and may also be electrically driven vehicles different from the host vehicle 2a (electric vehicles, fuel cell vehicles, etc.) or vehicles provided with only internal combustion engines as sources of drive power.

Figure 2:
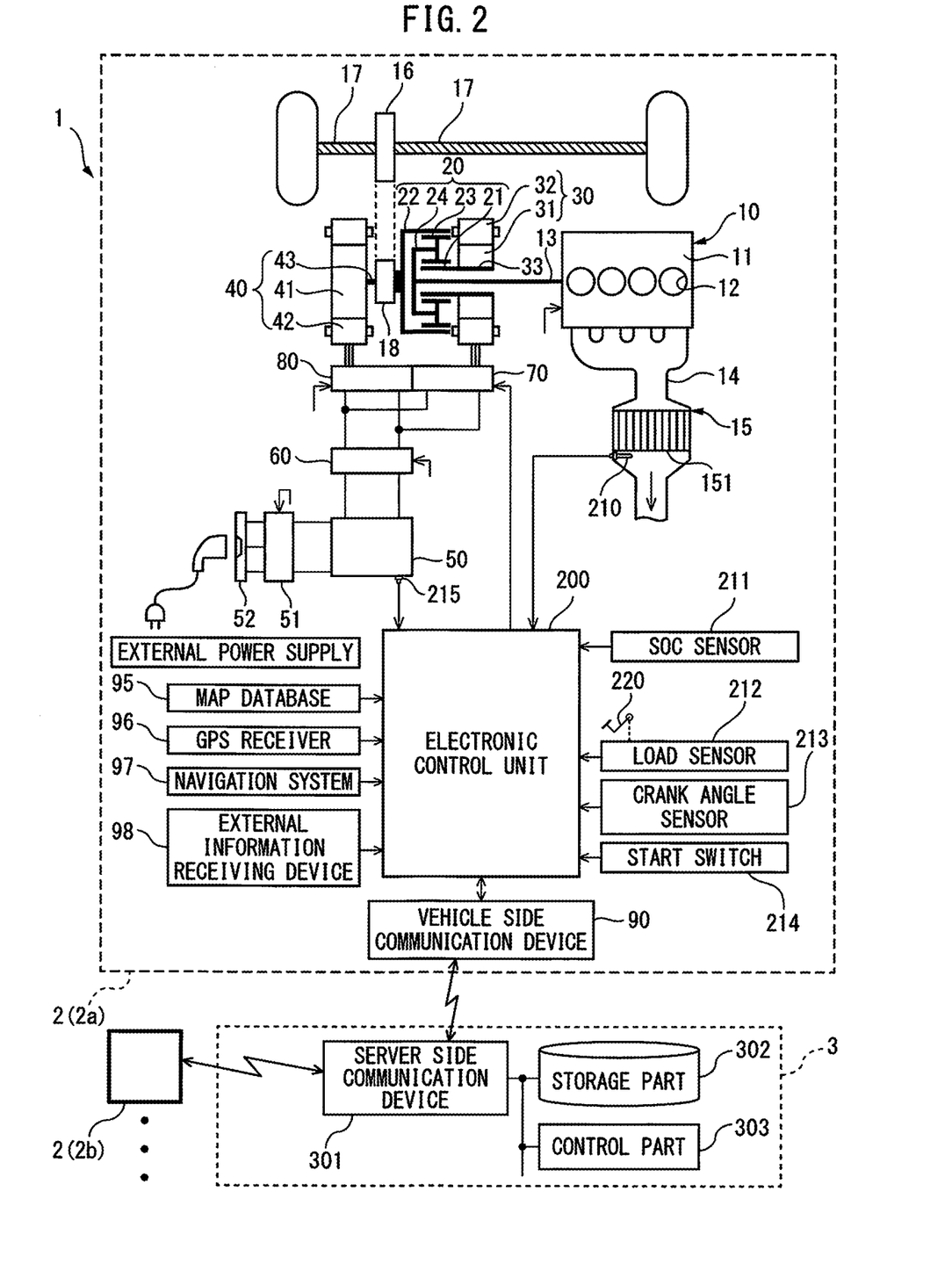
FIG. 2 is a view showing detailed hardware configurations of a host vehicle and a cloud server in the vehicle control system.

FIG. 2 is a view showing the detailed hardware configurations of the host vehicle 2a and the cloud server 3 in the vehicle control system 1.

The host vehicle 2a is a hybrid vehicle provided with an internal combustion engine 10, a power division mechanism 20, first rotating electric machine 30, second rotating electric machine 40, battery 50, boost converter 60, first inverter 70, second inverter 80, vehicle side communication device 90, and electronic control unit 200 and is configured to be able to transmit the power of one or both of the internal combustion engine 10 and second rotating electric machine 40 through the final reduction gear 16 to the wheel drive shaft 17. Further, the host vehicle 2a is provided with a map database 95, GPS receiver 96, navigation system 97, and external information receiving device 98 in addition to the internal combustion engine 10.

The internal combustion engine 10 makes fuel burn inside a cylinder 12 formed in an engine body 11 to cause generation of power for making an output shaft 13 connected with a crankshaft rotate. Exhaust discharged from the cylinder 12 to an exhaust passage 14 flows through the exhaust passage 14 and is discharged into the atmosphere. At the exhaust passage 14, a catalyst device 15 is provided for removing harmful substances from the exhaust. The catalyst device 15 is, for example, comprised of a honeycomb shaped substrate 151 carrying an oxidation catalyst or three-way catalyst or other catalyst having an exhaust purification function (exhaust purification catalyst) on its surface. Downstream of the substrate 151, a catalyst temperature sensor 210 is provided for detecting the catalyst temperature.

The power division mechanism 20 is a planetary gear for dividing the output of the internal combustion engine 10 into the two systems of power for making the wheel drive shaft 17 rotate and power for driving a regenerative operation of the first rotating electric machine 30 and is provided with a sun gear 21, ring gear 22, pinion gear 23, and planetary carrier 24.

The sun gear 21 is an external gear and is arranged at the center of the power division mechanism 20. The sun gear 21 is connected with a shaft 33 of the first rotating electric machine 30.

The ring gear 22 is an internal gear. It is arranged around the sun gear 21 so as to be concentric with the sun gear 21. The ring gear 22 is connected with a shaft 33 of the second rotating electric machine 40. Further, the ring gear 22 has integrally attached thereto a drive gear 18 for transmitting rotation of the ring gear 22 through the final reduction gear 16 to the wheel drive shaft 17.

A pinion gear 23 is an external gear. A plurality are arranged between the sun gear 21 and ring gear 22 so as to mesh with the sun gear 21 and ring gear 22.

The planetary carrier 24 is connected to the output shaft 13 of the internal combustion engine 10 and rotates about the output shaft 13. Further, the planetary carrier 24 is also connected to the pinion gears 23 so as to enable the pinion gears 23 to revolve (orbit) around the sun gear 21 while individually rotating on their axes when the planetary carrier 24 rotates.

The first rotating electric machine 30 is, for example, a three-phase AC synchronous type motor-generator and is provided with a rotor 31 attached to the outer circumference of the shaft 33 coupled with the sun gear 21 and having a plurality of permanent magnets embedded in its outer circumference and a stator 32 around which is wound an excitation coil generating a rotating magnetic field. The first rotating electric machine 30 has the function of a motor receiving the supply of power from the battery 50 and being driven in a power running mode and the function of a generator receiving power from the internal combustion engine 10 and being driven in a regeneration mode.

In the present embodiment, the first rotating electric machine 30 is mainly used as a generator. Further, when making the output shaft 13 rotate for cranking at the time of startup of the internal combustion engine 10, it is used as a motor and plays a role as a starter.

The second rotating electric machine 40 is, for example, a three-phase alternating current synchronous type motor-generator provided with a rotor 41 attached to the outer circumference of a shaft 43 connected to the ring gear 22 and having a plurality of permanent magnets embedded in the outer circumferential part and a stator 42 around which an excitation coil is wound and generating a rotating magnetic field. The second rotating electric machine 40 has a function as a motor receiving the supply of electric power from the battery 50 to drive powered operation and a function as a generator receiving power from the wheel drive shaft 17 to drive regenerative operation at the time of deceleration of the vehicle etc.

The battery 50 is, for example, a nickel-cadmium storage battery or nickel-hydrogen storage battery, lithium ion battery, or other rechargeable secondary battery. In the present embodiment, as the battery 50, a lithium ion secondary battery with a rated voltage of 200V or so is used. The battery 50 is electrically connected through a boost converter 60 etc. to the first rotary electrical machine 30 and second rotating electric machine 40 so as to enable charged power of the battery 50 to be supplied to the first rotary electrical machine 30 and second rotating electric machine 40 and drive them in the power running mode and, further, so as to enable the generated power of the first rotary electrical machine 30 and second rotating electric machine 40 to charge the battery 50. Further, the battery 50 is provided with a battery temperature sensor 215 for detecting the battery temperature.

In the present embodiment, the battery 50 is, for example, configured to be able to be electrically connected with an external power supply through a charging control circuit 51 and charging lid 52 so as to enable charging from a household power outlet or other external power supply. That is, the host vehicle 2a according to the present embodiment is made a so-called plug-in hybrid vehicle. The charging control circuit 51 is an electric circuit which can convert an AC current supplied from the external power supply to a DC current, boost the input voltage to the battery voltage, and charge the electric power of the external power supply to the battery 50 based on control signals from the electronic control unit 200.

The boost converter 60 is provided with an electrical circuit boosting the terminal voltage of the primary side terminal and outputting it from the secondary side terminal based on a control signal from the electronic control unit 200 and conversely lowering the terminal voltage of the secondary side terminal and outputting it from the primary side terminal based on a control signal from the electronic control unit 200. The primary side terminal of the boost converter 60 is connected to the output terminal of the battery 50, while the secondary side terminal is connected to the DC side terminals of the first inverter 70 and second inverter 80.

The first inverter 70 and second inverter 80 are provided with electrical circuits enabling them to convert direct currents input from the DC side terminals to alternating currents (in the present embodiment, three-phase alternating currents) and output them from the AC side terminals based on a control signal from the electronic control unit 200 and conversely to convert alternating currents input from the AC side terminals to direct currents and output them from the DC side terminals based on a control signal of the electronic control unit 200. The DC side terminal of the first inverter 70 is connected to the secondary side terminal of the boost converter 60, while the AC side terminal of the first inverter 70 is connected to the input/output terminal of the first rotary electrical machine 30. The DC side terminal of the second inverter 80 is connected to the secondary side terminal of the boost converter 60, while the AC side terminal of the second inverter 80 is connected to the input/output terminal of the second rotating electric machine 40.

The vehicle side communication device 90 is configured to be able to wirelessly communicate with a server side communication device 301 of the cloud server 3. The vehicle side communication device 90 transmits the driving information of the host vehicle 2a transmitted from the electronic control unit 200 to the cloud server 3 and transmits various types of information received from the cloud server 3 to the electronic control unit 200.

The map database 95 is a database relating to map information. This map database 95, for example, is stored in a hard disk drive (HDD) mounted in the host vehicle 2a. The map information includes positional information of a road or information on the road shape (for example, the gradient, type of curve or straight part, curvature of the curve, etc.), positional information of intersections and turnoffs, types of roads, speed limits, and various other road information.

The GPS receiver 96 receives signals from three or more GPS satellites to identify a latitude and longitude of the host vehicle 2a and detect the current position of the host vehicle 2a. The GPS receiver 96 sends the detected current position information of the host vehicle 2a to the electronic control unit 200.

The navigation system 97 sets a scheduled driving route of the host vehicle 2a based on the current position information of the host vehicle 2a detected by the GPS receiver 96, the map information of the map database 95, the destination set by the driver, etc. and sends information relating to the set scheduled driving route as navigation information to the electronic control unit 200.

The external information receiving device 98, for example, receives congestion information or weather information (rain, snow, fog, wind speed, and other information) and other external information sent from a road traffic information communication system center or other external communication center. The external information receiving device 98 transmits the received external information to the electronic control unit 200.

The electronic control unit 200 is a microcomputer provided with components connected with each other by a bidirectional bus such as a central processing unit (CPU), read only memory (ROM), random access memory (RAM), input port, and output port.

The electronic control unit 200 receives as input the output signals from various sensors such as an SOC sensor 211 for detecting a state of charge of the battery, a load sensor 212 for generating an output voltage proportional to an amount of depression of an accelerator pedal 220, a crank angle sensor 213 generating an output pulse every time a crankshaft of the engine body 11 rotates by for example 15° as a signal for calculating an engine rotational speed etc., and a start switch 214 for judging starting and stopping of the host vehicle 2a.

The electronic control unit 200 drives the controlled parts to control the host vehicle 2a based on the output signals of the various sensors etc. which are input.

The cloud server 3 is provided with the server side communication device 301, storage part 302, and control part 303. The server side communication device 301, storage part 302, and control part 303 are connected with each other through signal lines.

The server side communication device 301 is configured to be able to wirelessly communicate with the vehicle side communication devices 90 of the vehicles 2 (host vehicle 2a and other vehicles 2b). The server side communication device 301 transmits various types of information transmitted from the control part 303 in accordance with the demands of the vehicles 2 to the vehicles 2 and transmits driving information received from the vehicles 2 to the control part 303.

The storage part 302 has a hard disk drive, optical storage medium, semiconductor memory, or other storage medium and stores computer programs to be run at the control part 303. Further, the storage part 302 stores data generated by the control part 303 or driving information received by the control part 303 from the vehicles 2 etc.

The control part 303 is provided with one or more processors and their peripheral circuits for running computer programs for control and processing at the server 3.

Below, the various types of control according to the present embodiment performed by the electronic control unit 200 and the various types of control performed by the cloud server 3 along with the same will be explained.

First, the content of the basic driving control of the host vehicle 2a which the electronic control unit 200 performs, more particularly the content of the basic switching control of the driving mode, will be explained.

The electronic control unit 200 basically switches the driving mode of the host vehicle 2a based on the state of charge of the battery. Specifically, the electronic control unit 200 sets the driving mode of the host vehicle 2a to a CD (charge depleting) mode when the state of charge of the battery is larger than a predetermined mode switching state of charge (for example, 25% of the full state of charge). The CD mode is sometimes called the EV (electric vehicle) mode.

When the driving mode of the host vehicle 2a is set to the CD mode, the electronic control unit 200 basically makes the internal combustion engine 10 stop, uses the charged electric power of the battery 50 to drive the powered operation of the second rotating electric machine 40 in that state, and uses just the output of the second rotating electric machine 40 to make the wheel drive shaft 17 rotate. Further, when the vehicle demanded output set based on the amount of accelerator depression and vehicle speed becomes a first engine start output or more, the electronic control unit 200 as an exception operates the internal combustion engine 10 and uses both the outputs of the internal combustion engine 10 and second rotating electric machine 40 to make the wheel drive shaft 17 rotate. In the present embodiment, the first engine start output is made the upper limit value of output of the second rotating electric machine 40 calculated based on at least one of the state of charge of the battery and the battery temperature.

In this way, the CD mode is a mode preferentially utilizing the charged electric power of the battery 50 to drive powered operation of the second rotating electric machine 40 and basically using only the output of the second rotating electric machine 40 to drive the host vehicle 2a.

On the other hand, when the state of charge of the battery is a mode switching state of charge or less, the electronic control unit 200 sets the driving mode of the host vehicle 2a to a CS (charge sustaining) mode. The CS mode is a mode operating the host vehicle 2a so that the state of charge of the battery is sustained at the state of charge of the battery when switching to the CS mode and is sometimes also referred to as the HV (hybrid vehicle) mode.

When the driving mode of the host vehicle 2a is set to the CS mode, if the vehicle demanded output is less than a second engine start output, the electronic control unit 200 makes the internal combustion engine 10 stop, uses the charged electric power of the battery 50 to drive the powered operation of the second rotating electric machine 40 in that state, and uses just the output of the second rotating electric machine 40 to make the wheel drive shaft 17 rotate.

The second engine start output is a threshold value set so that the vehicle can be driven by only the output of the second rotating electric machine 40 at the time of start of the host vehicle 2a or the time of low speed driving etc. where the vehicle demanded output becomes relatively small since when the internal combustion engine 10 is low in output, the heat efficiency tends to become poor. Therefore, the second engine start output becomes a value smaller than the first engine start output. In the present embodiment, the second engine start output is made a variable value set in accordance with the state of charge of the battery and is set to a smaller value the smaller the state of charge of the battery.

Further, if the vehicle demanded output is the second engine start output or more, the electronic control unit 200 divides the output of the internal combustion engine 10 by the power division mechanism 20 into two systems, transmits one of the divided parts of the power of the internal combustion engine 10 to the wheel drive shaft 17, and uses the other part of the power to drive the regenerative operation of the first rotating electric machine 30. Further, the electronic control unit 200 basically uses the generated electric power of the first rotating electric machine 30 to drive the powered operation of the second rotating electric machine 40 and transmits the power of the second rotating electric machine 40 to the wheel drive shaft 17 in addition to the one part of the power of the internal combustion engine 10. At this time, if the state of charge of the battery is less than the state of charge of the battery when switched to the CS mode, part of the generated electric power of the first rotating electric machine 30 is charged to the battery 50.

Therefore, the CS mode basically can be said to be a driving mode, predicated on operation of the internal combustion engine 10, enabling the host vehicle 2a to be driven by only the output of the second rotating electric machine 40 under conditions of a poor heat efficiency of the internal combustion engine 10.

When in this way in the present embodiment, the vehicle demanded output becomes a certain output or more both during the CD mode and during the CS mode (in the CD mode, the first engine start output or more and in the CS mode, the second engine start output or more), the internal combustion engine 10 is started to secure the vehicle demanded output using the output of the internal combustion engine 10 in addition to the output of the second rotating electric machine 40. Further, if the internal combustion engine 10 is started, the exhaust discharged from the cylinders 12 of the engine body 11 to the exhaust passage 14 flows through the exhaust passage 14 and is discharged into the atmosphere.

The harmful substances in the exhaust can be removed by the catalyst device 15 when the catalyst device 15 finishes being heated, that is, when the temperature of the catalyst supported on the substrate 151 of the catalyst device 15 becomes the activation temperature where the exhaust purification function of the catalyst is activated or becomes more.

On the other hand, right after the startup of the internal combustion engine 10 or otherwise before the catalyst device 15 finishes being heated, it is not possible to sufficiently remove the harmful substances in the exhaust by the catalyst device 15, so the exhaust emission deteriorates. Therefore, after starting up the internal combustion engine 10, it is desirable to finish heating the catalyst device 15 as early as possible.

However, in each driving mode, the output of the internal combustion engine 10 after starting up the internal combustion engine 10 for securing the vehicle demanded output depends on the vehicle demanded output. Further, the exhaust temperature of the internal combustion engine 10 basically depends on the output of the internal combustion engine 10 and tends to become higher along with the output of the internal combustion engine 10 becoming higher. For this reason, depending on the vehicle demanded output, after starting up the internal combustion engine 10, a situation can arise where the internal combustion engine 10 is continuously operated at a low output, so it is liable to become impossible to make the heating of the catalyst device 15 finish early.

Therefore, to suppress deterioration of the exhaust emission right after engine start, it is desirable to perform catalyst heating control at a suitable timing before it becomes necessary to use the output of the internal combustion engine 10 to secure the vehicle demanded output, that is, before using the output of the internal combustion engine 10 as part of the vehicle demanded output (drive force), and to finish heating of the catalyst device 15 before using the output of the internal combustion engine 10 as part of the vehicle demanded output. If before using the output of the internal combustion engine 10 as part of the vehicle demanded output, it is not necessary to convert the combustion energy to output, so for example no problem arises even if performing, as catalyst heating control, control greatly delaying the ignition timing of the internal combustion engine 10 or using some other technique to make the exhaust loss of the internal combustion engine 10 increase. By performing such catalyst heating control to make the exhaust loss increase, it is possible to make the exhaust temperature a high temperature. As a result, it is possible to finish heating the catalyst device 15 early, so it is possible to suppress deterioration of the exhaust emission right after engine start.

Here, as mentioned above, the CS mode is basically a driving mode predicated on operating the internal combustion engine 10, so basically the internal combustion engine 10 is started after the driving mode is switched from the CD mode to the CS mode. Further, the switching from the CD mode to the CS mode depends on the state of charge of the battery. Therefore, in the present embodiment, if the state of charge of the battery falls to a predetermined heating start state of charge larger than the mode switching state of charge in the CD mode, catalyst heating control is performed in accordance with need.

On the other hand, whether the internal combustion engine 10 is started up in the CD mode, that is, whether the vehicle demanded output becomes the first engine start output or more in the CD mode, is determined in accordance with the characteristics of the driver driving the host vehicle 2a or the presence of any congestion or other such road conditions, battery conditions, etc. at the time. For this reason, in the CD mode, it is difficult to predict when the internal combustion engine 10 will be started. Therefore, there is the problem that it is difficult to perform catalyst heating control at a suitable timing in preparation for an increase of the engine demanded output.

Therefore, in the present embodiment, it is made possible to collect driving information which had been sent from the plurality of the vehicles 2 in the cloud server 3 and perform catalyst heating control at a suitable timing based on the collected information.

Figure 3:
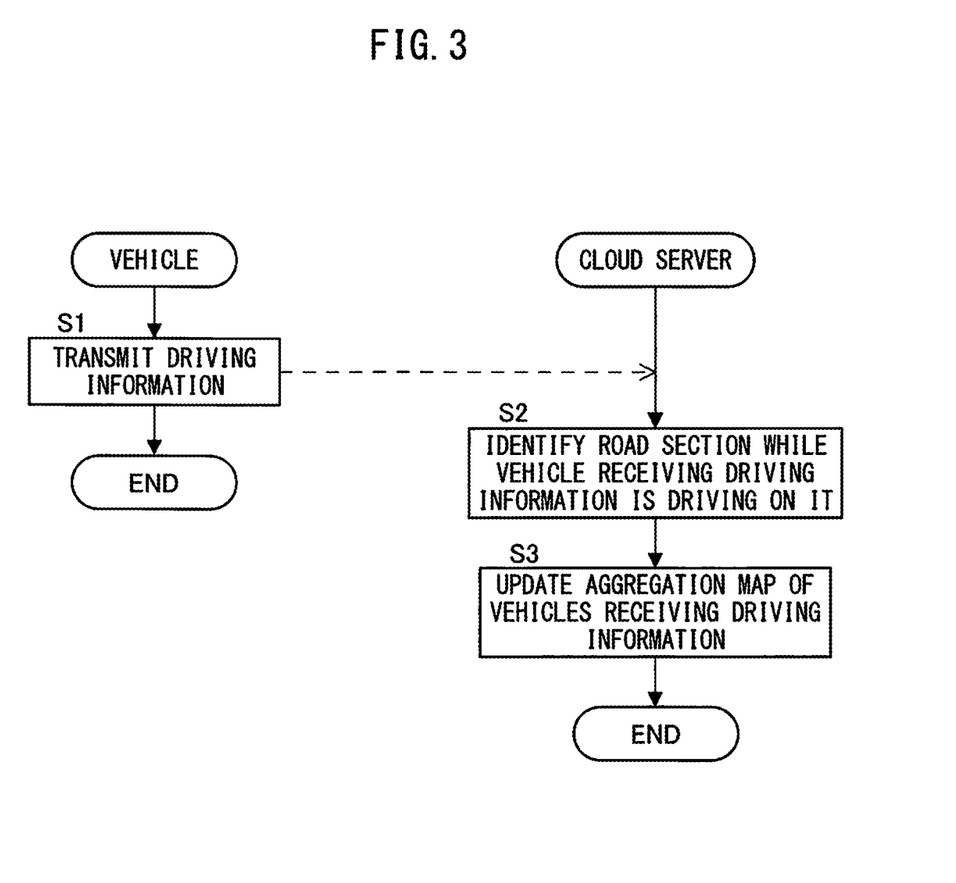
FIG. 3 is a flow chart explaining processing performed at a server when driving information has been transmitted from the vehicles.

FIG. 3 is a flow chart explaining processing performed at the server 3 when driving information is transmitted from the vehicles 2 (host vehicle 2a and other vehicles 2b). Note that FIG. 3 shows an example of the case where driving information is transmitted from the host vehicle 2a.

At step S1, the electronic control unit 200 sends the driving information of the host vehicle 2a to the cloud server 3. The driving information includes vehicle identification information for identifying the host vehicle 2a (for example, the vehicle license plate number) and the current position of the host vehicle 2a, the speed [km/h] of the host vehicle 2a at the current position, and the value of a parameter relating to the output of the host vehicle 2a at the current position (below, referred to as the "value of the output parameter").

The value of the output parameter is a parameter in a correlative relationship with the output of the host vehicle 2a and may also simply be the output at the current position of the host vehicle 2a. In the present embodiment, among the parameters in a correlative relationship with the output of the host vehicle 2a, the output weight ratio[kW/kg] obtained by dividing the vehicle demanded output [kW] at the current position of the host vehicle 2a by the weight of the host vehicle 2a [kg] is made the value of the output parameter. This is because even if, for example, two vehicles with different weights were driving steadily at the same vehicle speeds, the output at that time becomes higher at the vehicle with the larger weight. This is because by making the output weight ratio the value of the output parameter, a parameter relating to the output after elimination of the effect of the vehicle weight is obtained.

Figure 4:
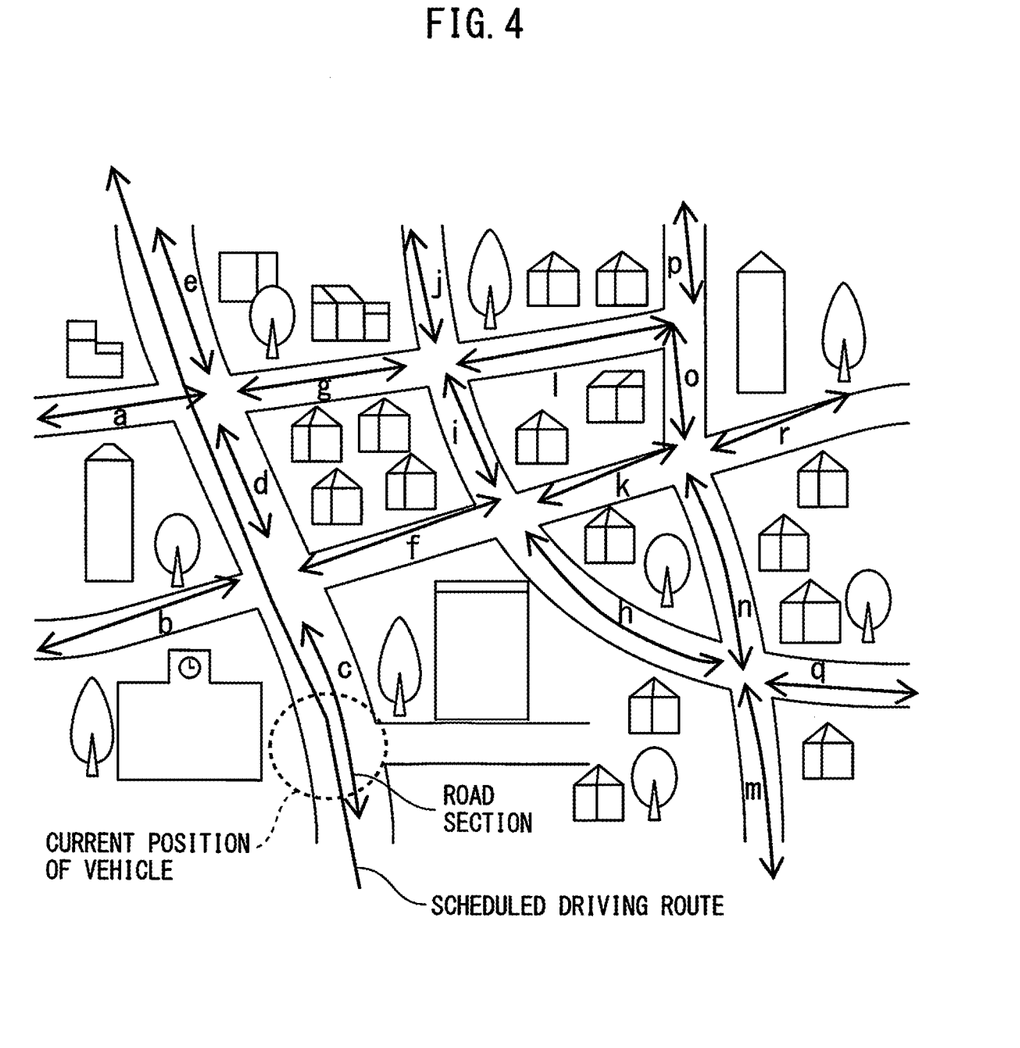
FIG. 4 is a view showing part of the road section information obtained by dividing a road on a map in advance into a plurality of road sections.

At step S2, the server 3 identifies the road section which the host vehicle 2a is driving on based on the current position in the currently received driving information of the host vehicle 2a. In the present embodiment, the server 3, as shown in FIG. 4, divides a road in the map in advance into a plurality of road sections (in FIG. 4, 18 road sections from "a" to "r" shown) and stores the obtained road section information in the storage part 302. It refers to that road section information and identifies the road section on which the host vehicle 2a is driving based on the current position of the host vehicle 2a.

At step S3, the server 3 updates the aggregation map (see FIG. 5) storing the output values of the parameter when the host vehicle 2a was driving on each road section in the past linked with the vehicle speeds at that time for each road section. The fields of the aggregation map (empty fields in figure) store the values of the output parameter when driving over the same road section in the past by the same vehicle speed and the average values of the values of the output parameter (below, the "average values of the output parameter").

Figure 5:
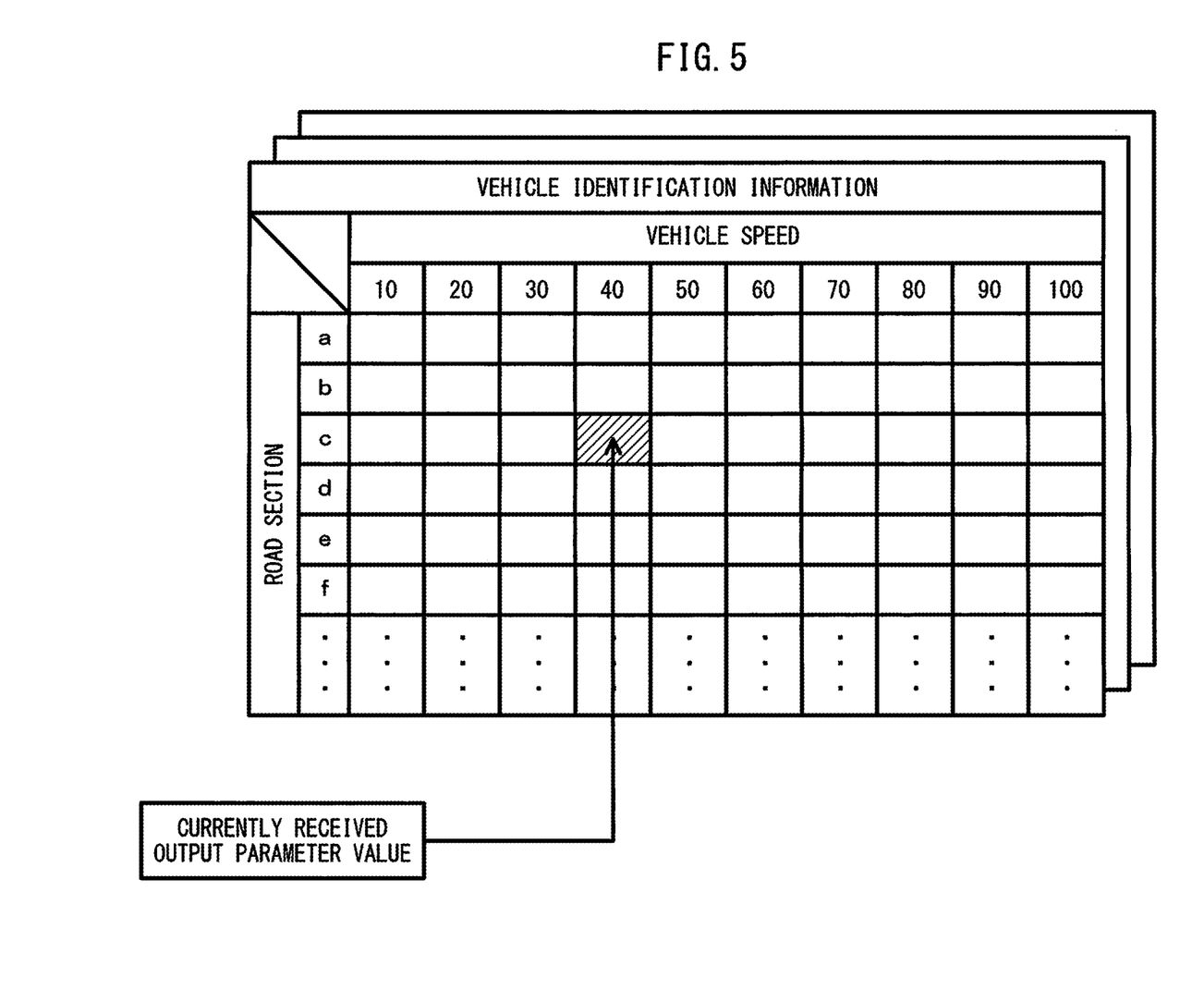
FIG. 5 is a view showing one example of an aggregation map storing for each road section values of an output parameter when vehicles drove through the road sections in the past linked with the vehicle speeds at that time.

At step S3, first, the server 3 calls up the aggregation map of the host vehicle 2a based on the vehicle identification information in the currently received driving information of the host vehicle 2a. As shown in FIG. 5, one aggregation map is prepared for each vehicle 2.

Next, based on the identified road section and vehicle speed in the currently received driving information of the host vehicle 2a, the server 3 identifies the updated field storing and updating the value of the output parameter in the currently received driving information of the host vehicle 2a. For example, if the road section is "c" and the vehicle speed is 40 km/h, the field shown by hatching in FIG. 5 becomes the updated field.

Finally, the server 3 stores the value of the output parameter in the currently received driving information of the host vehicle 2a in the updated field and updates the average value of the output parameter of the updated field to the average value including the newly stored value of the output parameter.

Figure 6:
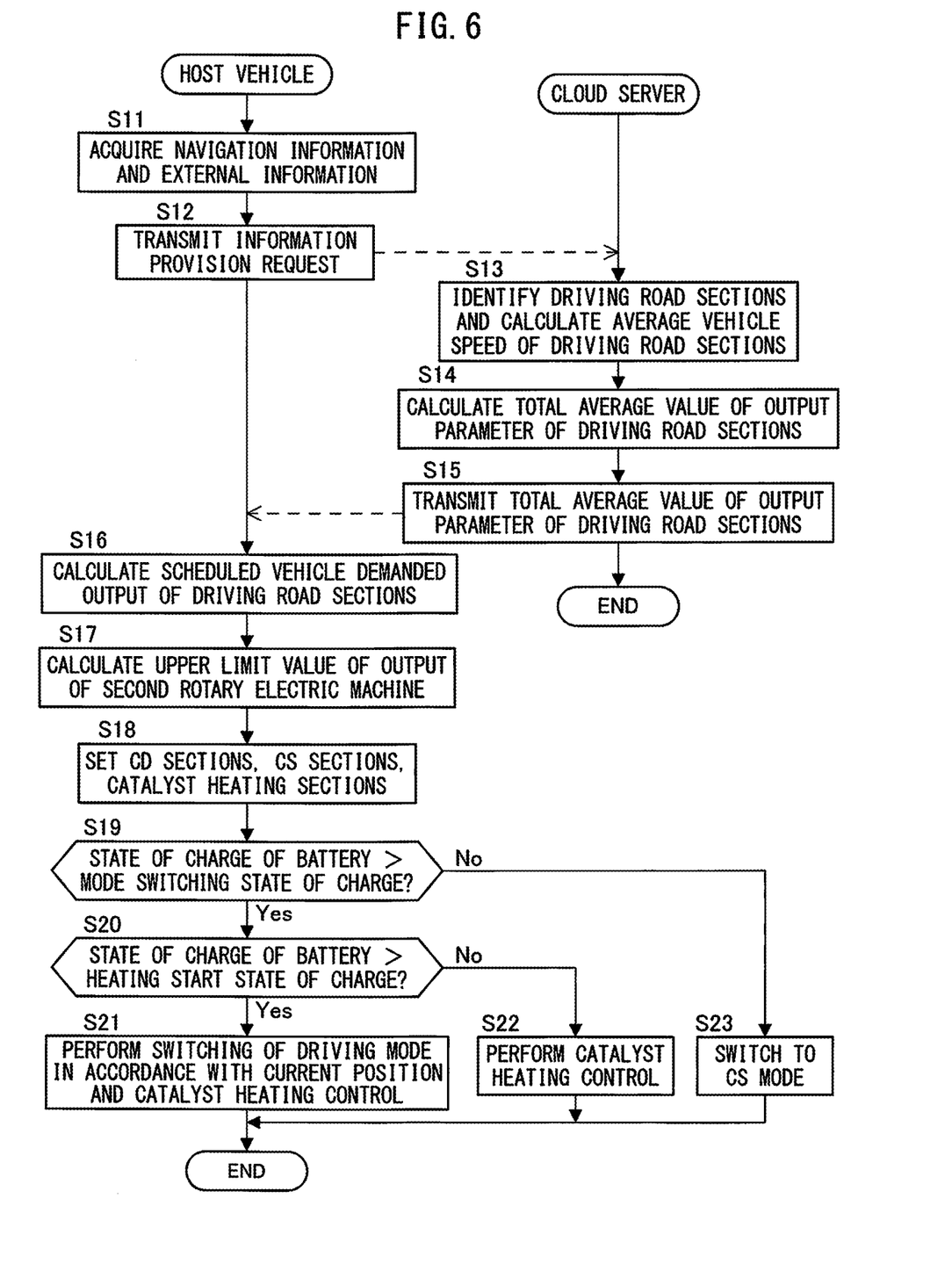
FIG. 6 is a flow chart explaining driving control according to one embodiment of the present disclosure performed by the electronic control unit of the host vehicle and processing performed at the server along with this.

FIG. 6 is a flow chart explaining the driving control according to the present embodiment performed by the electronic control unit 200 of the host vehicle 2a and the processing performed by the server 3 along with that. Note that the driving mode is initially set to the CD mode. The electronic control unit 200 repeatedly performs the present routine by a predetermined processing cycle when the driving mode is set to the CD mode.

At step S11, the electronic control unit 200 acquires navigation information from the navigation system 97 (scheduled driving route etc.) and acquires external information from the external information receiving device 98 (congestion information or other road information). Further, the electronic control unit 200 refers to the road information on the scheduled driving route and calculates the scheduled vehicle speed at different points for example set at certain intervals on the scheduled driving route.

At step S12, the electronic control unit 200 transmits an information demand request to the server 3. An information demand request includes vehicle identification information of the host vehicle 2a, the scheduled driving route, and the scheduled vehicle speed at different points on the scheduled driving route.

At step S13, the server 3 refers to the above-mentioned road section information to identify the road sections present on the scheduled driving route as driving road sections and calculates the average vehicle speeds of the driving road sections based on the scheduled vehicle speed at the different points on the scheduled driving route.

At step S14, the server 3 refers to the aggregation map of the vehicles 2 stored in the storage part 302 and extracts the average values of the output parameter of the vehicles 2 linked with a vehicle speed of the same extent as the scheduled vehicle speed when the host vehicle 2a drives over the driving road sections. Further, it calculates the average value of the average values of the output parameter of the vehicles 2 extracted (below, referred to as the "total average value of the output parameter"). The total average value of the output parameter, in other words, can be said to mean the average value of the values of the output parameter of all of the vehicles 2 driving by a speed of the same extent as the scheduled vehicle speed when the host vehicle 2a is driving over a certain road section.

At step S15, the server 3 sends the total average value of the output parameter of each road section to the vehicle 2 sending the information demand request (that is, the host vehicle 2a).

At step S16, the electronic control unit 200 multiplies the total average value of the output parameter for each road section transmitted from the server 3 with the weight of the host vehicle 2a to calculate the scheduled vehicle demanded output of the host vehicle 2a of the driving road section when the host vehicle 2a is driving on the driving road section.

At step S17, the electronic control unit 200 calculates the upper limit value of output of the second rotating electric machine 40 based on at least one of the state of charge of the battery and the battery temperature. In the present embodiment, the electronic control unit 200 calculates the upper limit value of output of the second rotating electric machine 40 based on the battery temperature. Specifically, when the battery temperature is high, compared to when it is low, the upper limit value of output of the second rotating electric machine 40 is made to become smaller.

At step S18, the electronic control unit 200 compares the scheduled average output of the host vehicle 2a of the road section with the upper limit value of output of the second rotating electric machine 40. Further, the electronic control unit 200 judges that the driving road section where the scheduled vehicle demanded output is the upper limit value of output or less of the second rotating electric machine 40 is basically a road section which can be driven on by just the output of the second rotating electric machine 40 and sets it to a CD section driven on by the CD mode.

On the other hand, the electronic control unit 200 judges that the driving road section where the scheduled vehicle demanded output is larger than the upper limit value of output of the second rotating electric machine 40 is a road section with a high probability of not only the output of the second rotating electric machine 40, but also the output of the internal combustion engine 10 having to be used to secure the vehicle demanded output and sets it to a CS section driven on by the CS mode. Further, it sets a predetermined section right before the CS section as a catalyst heating section for performing catalyst heating control in accordance with need. Therefore, the catalyst heating section is set at part of the CD section.

At step S19, the electronic control unit 200 judges if the state of charge of the battery is larger than the above-mentioned mode switching state of charge. If the state of charge of the battery is larger than the mode switching state of charge, the electronic control unit 200 proceeds to the processing of step S20. On the other hand, if the state of charge of the battery is the mode switching state of charge or less, the electronic control unit 200 proceeds to the processing of step S23.

At step S20, the electronic control unit 200 judges if the state of charge of the battery is larger than the above-mentioned heating start state of charge. The electronic control unit 200 proceeds to the processing of step S21 if the state of charge of the battery is larger than the heating start state of charge. On the other hand, the electronic control unit 200 proceeds to the processing of step S22 if the state of charge of the battery is the heating start state of charge or less.

At step S21, the electronic control unit 200 identifies the road section currently being driven over based on the current position of the host vehicle 2a and judges which of the CD section, CS section, or catalyst heating section the road section is.

Further, if the road section currently being driven over is the CD section, the electronic control unit 200 sets the driving mode to the CD mode to drive the host vehicle 2a, while if it is the CS section, sets the driving mode to the CS mode to drive the host vehicle 2a.

Further, the electronic control unit 200 judges if the catalyst device 15 has to be heated based on the current catalyst temperature if the road section currently being driven on is a catalyst heating section. Specifically, it judges that the catalyst device 15 has to be heated if the catalyst temperature is less than the activation temperature. Further, when it judged that the catalyst device 15 has to be heated, it calculates the time required for making the catalyst temperature rise to the activation temperature based on the catalyst temperature and performs catalyst heating control while driving on the catalyst heating section so that the catalyst device 15 finishes being heated before the host vehicle 2a enters a CS section set right after the catalyst heating section.

At step S22, since switching to the CS mode due to a drop in the state of charge of the battery is predicted, the electronic control unit 200 judges if the catalyst device 15 has to be heated based on the current catalyst temperature. Further, when it is judged that the catalyst device 15 has to be heated, it calculates the time required for making the catalyst temperature rise to the activation temperature based on the catalyst temperature and performs catalyst heating control while driving on a catalyst heating section so that the catalyst device 15 finishes being heated before the state of charge of the battery becomes the mode switching state of charge or less.

At step S23, the electronic control unit 200 sets the driving mode to the CS mode to drive the host vehicle 2a.

According to the present embodiment explained above, there is provided an electronic control unit 200 (control device) of a hybrid vehicle for controlling a hybrid vehicle which is able to be driven by the output of at least one of an internal combustion engine 10 and second rotating electric machine 40 and which comprises an internal combustion engine 10 provided with a catalyst device 15 for purifying exhaust discharged from the engine body 11, a rechargeable battery 50, a second rotating electric machine 40 (rotating electric machine) driven by electric power of the battery 50, and a vehicle side communication device (communication device) 90 configured to be able to communicate with a server 3 storing values of an output parameter of a plurality of vehicles 2 when the plurality of vehicles 2 drive over a preset plurality of road sections (values of parameters relating to output) linked with the vehicle speeds at those times collectively for each road section. The electronic control unit 200 is provided with a driving control part using the output of the internal combustion engine 10 as part of the drive power and driving the vehicle by the outputs of the internal combustion engine 10 and the second rotating electric machine 40 if when making the internal combustion engine 10 stop and driving by the output of the second rotating electric machine 40, the vehicle demanded output becomes an engine start output (first engine start output or second engine start output) or more.

Further, the driving control part is configured to acquire for each driving road section from the server 3 the value of the output parameter (value of a parameter) linked with a vehicle speed of the same extent as the scheduled vehicle speed when driving over a driving road section of a road section present on a scheduled driving route and to calculate for each driving road section the scheduled vehicle demanded output when driving over the driving road section based on the acquired value of the output parameter and, when there is a driving road section with a scheduled vehicle demanded output of the engine start output or more, to heat the catalyst device 15 before using the output of the internal combustion engine 10 as part of the drive power.

In this way, according to the present embodiment, it is possible to calculate a scheduled vehicle demanded output of each driving road section based on the values of the output parameter of vehicles 2 linked with a vehicle speed of the same extent as the scheduled vehicle speed when driving over the driving road section collected at the server 3. Due to this, it is possible to calculate the scheduled vehicle demanded output corresponding to the road conditions at each instant such as the existence of congestion at the driving road sections, so it is possible to perform catalyst heating control at a suitable timing in preparation for an increase in the vehicle demanded output.

Specifically, the driving control part is configured so as to heat the catalyst device 15 if the temperature of the catalyst device 15 is less than the activation temperature (predetermined temperature) in a driving road section right before a driving road section where the scheduled vehicle demanded output becomes the engine start output or more. In more detail, it is configured so that, if the temperature of the catalyst device 15 is less than the activation temperature (predetermined temperature), it calculates the time required for raising the temperature of the catalyst device 15 to the activation temperature based on the temperature of the catalyst device 15 and heats the catalyst device 15 so that the catalyst device 15 finishes being heated before entering a driving road section where the scheduled vehicle demanded output becomes the engine start output or more.

Due to this, regardless of the catalyst device 15 finishing being heated, it is possible to keep the internal combustion engine 10 from ending up being unnecessarily started so as to heat the catalyst device 15 and possible to reliably finish heating the catalyst device 15 in preparation for an increase of the vehicle demanded output.

Further, in the present embodiment, as the value of the output parameter, the output weight ratio obtained by dividing the output at the time of driving by the vehicle weight, that is, a parameter in a correlative relationship with the output of the vehicle 2 from which the effect of the weight of the vehicle 2 has been eliminated, is used, so it is possible to effectively utilize data relating to output among vehicles of different weights. For this reason, it is possible to increase the number of data points able to be utilized when calculating the scheduled vehicle demanded output. As a result, it is possible to improve the precision of the scheduled vehicle demanded output of each driving road section and possible to perform catalyst heating control at a more suitable timing in preparation for an increase in the vehicle demanded output.

Above, an embodiment of the present disclosure was explained, but the above embodiment only shows some of the examples of application of the present disclosure. It is not meant to limit the technical scope of the present disclosure to the specific constitutions of the above embodiment.

For example, in the above embodiment, at step S16 of the flow chart of FIG. 6, the electronic control unit 200 calculated the scheduled vehicle demanded output when driving over a driving road section for each driving road section based on the value of the output parameter acquired from the cloud server 3, but the scheduled vehicle demanded output may also be calculated by the cloud server 3. That is, it is also possible to acquire from the cloud server 3 the scheduled vehicle demanded output for each driving road section calculated at the cloud server 3 based on the value of the output parameter for each driving road section. In this case, after step S15 of the flow chart of FIG. 6, it is sufficient to perform processing corresponding to step S16 at the cloud server 3 and transmit the scheduled vehicle demanded output for each driving road section to the electronic control unit 200.

Further, in the above embodiment, the total average value of the output parameter of each driving road section was multiplied with the weight of the host vehicle 2a to calculate the scheduled vehicle demanded output of each driving road section of the host vehicle 2a. Here, as explained above, the total average value of the output parameter of a certain road section is the average value of the value of the output parameters of all of the vehicles 2 driving on that road section. For this reason, a certain extent of discrepancy may arise between the total average value of the output parameter and for example, the average value of the output parameter of the host vehicle 2a.

Therefore, for example, it is also possible to learn to what extent an average value of the output parameter of the host vehicle 2a deviates from the total average value of the output parameter and other aspects of the correlative relationship between the average value of the output parameter of the host vehicle 2a and the total average value of the output parameter by, for example, machine learning or other technique for each road section by the cloud server 3. Further, it is also possible to correct the total average value of the output parameter to correspond to the host vehicle 2a based on the correlative relationship between the average value of the output parameter of the host vehicle 2a and the total average value of the output parameter obtained by learning. Specifically, it is also possible to calculate the degree of discrepancy "n" (correction coefficient) of the average value of the output parameter of the host vehicle 2a and the total average value of the output parameter for each road section by machine learning, multiply the total average value of the output parameter with the degree of discrepancy "n", and transmit the result to the host vehicle 2a at step S15 of the flow chart of FIG. 6.

In this way, by learning the degree of discrepancy "n" between the values of the output parameter of the plurality of vehicles 2 (values of parameters relating to the output) and the value of the output parameter of the host vehicle 2a (hybrid vehicle) for each road section by the cloud server 3 and correcting based on the degree of discrepancy "n" the value of the output parameter linked with a vehicle speed of the same extent as the scheduled vehicle speed when the host vehicle 2a is driving on a driving road section, it is possible to improve the precision of the scheduled vehicle demanded output of the driving road sections of the host vehicle 2a, so it is possible to perform catalyst heating control at a more suitable timing in preparation for an increase of the vehicle demanded output.

Further, in the above embodiment, as one example of catalyst heating control, the method of using the exhaust heat when operating the internal combustion engine 10 to heat the catalyst device 15 was shown, but the disclosure is not limited to such a method.

For example, if providing an electric heating device energizing the substrate 151 of the catalyst device 15 to electrically heat the substrate 151, it is also possible to use the electrical heating device to electrically heat the substrate 151 so as to heat the catalyst device 15 before the internal combustion engine 10 is started in preparation for an increase in the engine demanded output, that is, before using the output of the internal combustion engine 10 as part of the drive power. Further, it is also possible to add to the catalyst supported on the surface of the substrate 151 a microwave absorber absorbing microwaves to generate heat (for example, silicon carbide particles (SiC particles) or other derivative or ferrite or other magnetic material) and irradiate the catalyst to which the microwave absorber is added with microwaves so as to heat the catalyst device 15 before the internal combustion engine 10 is started in preparation for an increase in the engine demanded output, that is, before using the output of the internal combustion engine 10 as part of the drive power.

The invention claimed is:

1. A control device for a hybrid vehicle, the hybrid vehicle comprising:
    an internal combustion engine provided with a catalyst device for purifying exhaust discharged from an engine body;
    a rotating electric machine driven by electric power of a battery; and
    a communication device configured to be able to communicate with a server storing values of a parameter relating to outputs of a plurality of vehicles when the plurality of vehicles are driving over a preset plurality of road sections linked with vehicle speeds at that time and collected for each road section, wherein
    the hybrid vehicle is able to be driven by the output of at least one of the internal combustion engine and the rotating electric machine, and
    the control device comprises a driving control part configured to use the output of the internal combustion engine as part of the drive power and drive the vehicle by the outputs of the internal combustion engine and the rotating electric machine if when making the internal combustion engine stop and driving by the output of the rotating electric machine, the vehicle demanded output becomes an engine start output or more, and
    the driving control part is configured:
        to acquire a value of the parameter linked with a vehicle speed of the same extent as the scheduled vehicle speed when driving over a road section present on a scheduled driving route as a driving road section for each driving road section from the server and to calculate the scheduled vehicle demanded output when driving over the driving road section based on the acquired value of the parameter for each driving road section or configured to acquire from the server the scheduled vehicle demanded output for each driving road section calculated based on the value of the parameter for each driving road section at the server; and
        to heat the catalyst device before using the output of the internal combustion engine as part of the drive power when there is a driving road section where the scheduled vehicle demanded output becomes the engine start output or more.

2. The control device for the hybrid vehicle according to claim 1, wherein
    the value of a parameter is an output weight ratio obtained by dividing the output at the time of driving by the vehicle weight.

3. The control device for the hybrid vehicle according to claim 1, wherein
    the driving control part is further configured to heat the catalyst device if the temperature of the catalyst device is less than a predetermined temperature in the driving road section right before the driving road section where the scheduled vehicle demanded output becomes the engine start output or more.

4. The control device of the hybrid vehicle according to claim 3, wherein
    the driving control part is configured:
        to calculate the time required for raising the temperature of the catalyst device up to the predetermined temperature based on the temperature of the catalyst device if the temperature of the catalyst device is less than the predetermined temperature in the driving road section right before the driving road section where the scheduled vehicle demanded output becomes the engine start output or more; and
        to heat the catalyst device so that the catalyst device finishes being heated before entering the driving road section where the scheduled vehicle demanded output becomes the engine start output or more.

5. The control device for the hybrid vehicle according to claim 1, wherein the driving control part is further configured to set the engine start output based on a state of charge of the battery.

6. The control device for the hybrid vehicle according to claim 1, wherein
the driving control part is further configured to set the engine start output based on a temperature of the battery.

7. A control system for a hybrid vehicle able to be driven by an output of at least one of an internal combustion engine provided with a catalyst device for purifying exhaust discharged from an engine body and a rotating electric machine driven by electric power of a battery,
the control system comprising:
a server storing values of the parameter relating to outputs of a plurality of vehicles including the hybrid vehicle when the plurality of vehicles are driving over a preset plurality of road sections linked with vehicle speeds at that time and collected for each road section;
a communication device mounted in the hybrid vehicle and able to communicate with the server; and
a control device mounted in the hybrid vehicle and using the output of the internal combustion engine as part of the drive power to thereby drive the hybrid vehicle by the outputs of the internal combustion engine and the rotating electric machine if when making the internal combustion engine stop and driving by the output of the rotating electric machine, the vehicle demanded output becomes an engine start output or more,
the control device is configured:
to acquire a value of the parameter linked with a vehicle speed of the same extent as the scheduled vehicle speed when driving over a road section present on a scheduled driving route of the hybrid vehicle as a driving road section for each driving road section from the server and to calculate the scheduled vehicle demanded output when driving over the driving road section based on the acquired value of the parameter for each driving road section or to acquire from the server the scheduled vehicle demanded output for each driving road section calculated based on the value of the parameter for each driving road section at the server; and
to heat the catalyst device before using the output of the internal combustion engine as part of the drive power when there is the driving road section where the scheduled vehicle demanded output becomes the engine start output or more.

8. The control system for the hybrid vehicle according to claim 7, wherein
the server is configured:
to learn a degree of discrepancy between the values of the parameter relating to output of the plurality of vehicles and the value of a parameter relating to the output of the hybrid vehicle for each road section; and
to correct based on the degree of discrepancy the value of the parameter linked with a vehicle speed of the same extent as the scheduled vehicle speed when the hybrid vehicle is driving over a driving road section.

* * * * *